(12) United States Patent
Tell et al.

(10) Patent No.: US 7,380,022 B2
(45) Date of Patent: May 27, 2008

(54) METHOD AND APPARATUS FOR TRANSMITTING WIRED DATA VOICE OVER IP DATA AND WIRELESS DATA THROUGH A COMMON IP CORE NETWORK

(75) Inventors: Daniel Francis Tell, Lake Forest, IL (US); William R. Pierce, Algonquin, IL (US); Kaveh Vessal, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 1085 days.

(21) Appl. No.: 10/034,890

(22) Filed: Dec. 28, 2001
(Under 37 CFR 1.47)

(65) Prior Publication Data

US 2003/0125021 A1 Jul. 3, 2003

(51) Int. Cl.
*G06F 15/16* (2006.01)
*H04L 12/28* (2006.01)

(52) U.S. Cl. .................................. 709/249; 370/390
(58) Field of Classification Search ................ 709/202, 709/203, 219, 229, 249; 370/390
See application file for complete search history.

(56) References Cited

U.S. PATENT DOCUMENTS

| | | | |
|---|---|---|---|
| 6,337,858 B1 * | 1/2002 | Petty et al. ................. | 370/356 |
| 6,597,687 B1 * | 7/2003 | Rao ........................... | 370/352 |
| 6,678,515 B1 * | 1/2004 | Gillespie et al. .......... | 455/412.1 |
| 6,683,870 B1 * | 1/2004 | Archer ....................... | 370/356 |
| 6,745,244 B1 * | 6/2004 | Cosgriff et al. ............. | 709/227 |
| 6,922,721 B1 * | 7/2005 | Minborg et al. ............ | 709/219 |
| 6,944,444 B1 * | 9/2005 | Gillespie et al. ............ | 455/417 |
| 6,978,004 B1 * | 12/2005 | Levine .................... | 379/211.04 |
| 6,993,119 B1 * | 1/2006 | Zhang et al. ............. | 379/88.01 |
| 6,997,873 B2 * | 2/2006 | Bardy ........................ | 600/300 |
| 7,010,599 B2 * | 3/2006 | Shrinivasan et al. ........ | 709/225 |
| 7,023,967 B1 * | 4/2006 | Andersson et al. ...... | 379/88.12 |
| 7,111,052 B1 * | 9/2006 | Cook .......................... | 709/219 |

\* cited by examiner

*Primary Examiner*—Ario Etienne
*Assistant Examiner*—Sargon N Nano

(57) ABSTRACT

A system for transmitting data through an IP core network so that data may be transmitted from an originating source, through a public switched telephone network (PSTN) and through the IP core network to a land line telephone and a cellular telephone. The system includes an IP core network that is coupled to the PSTN through an interface. The IP core network is also coupled to an access IP network. A radio access network is coupled to the IP core network and the cellular telephone. Upon receipt of data from the originating source, the IP core network simultaneously initiates a ringing of the land line telephone through the access IP network and a paging of the cellular telephone through the radio access network.

27 Claims, 6 Drawing Sheets

METHOD AND APPARATUS FOR TRANSMITTING WIRED DATA VOICE OVER IP DATA AND WIRELESS DATA THROUGH A COMMON IP CORE NETWORK

FIELD OF THE INVENTION

The present invention relates generally to communication networks, and more particularly, the present invention relates to a method and apparatus for combining wired technology, voice over IP technology and wireless technology by transmitting wired, voice over IP and wireless data through a common IP core network thereby enabling service providers the capability of bundling wired, voice over IP and wireless services as well as other data and video services.

BACKGROUND OF THE INVENTION

Currently, wireless or cellular telephone systems and wired or so-called "land line" telephone systems are operated as separate networks forcing consumers who utilize a wired telephone and a wireless telephone to maintain separate relationships with the wired service provider and wireless service provider. Further, additional providers may be required for long distance service, local service, other data services such as Internet connection and video services such as cable TV. Thus, it is possible for consumers to have relationships with separate service providers for their wired and wireless telephones, cable television, long distance telephone company and Internet access provider.

This multiple service provider system presents several drawbacks to the consumer. Specifically, there is no transparency or connection between a wired telephone and a wireless telephone. Hence, consumers are forced to have at least two telephone numbers if both wired and wireless service is desired. Further, certain features must be duplicated, such as voice mail. Consumers are also imposed with the administrative burden of managing multiple service provider bills along with the multiple phone numbers and multiple voice mail boxes.

Accordingly, there is a need for a single system which can combine wired, wireless and high-speed data technologies in a single network. Such a system would allow consumers to utilize a single service provider for numerous services, simplify billing procedures and improve efficiencies.

DETAILED DESCRIPTION OF THE PRESENTLY PREFERRED EMBODIMENTS

Figure 1:
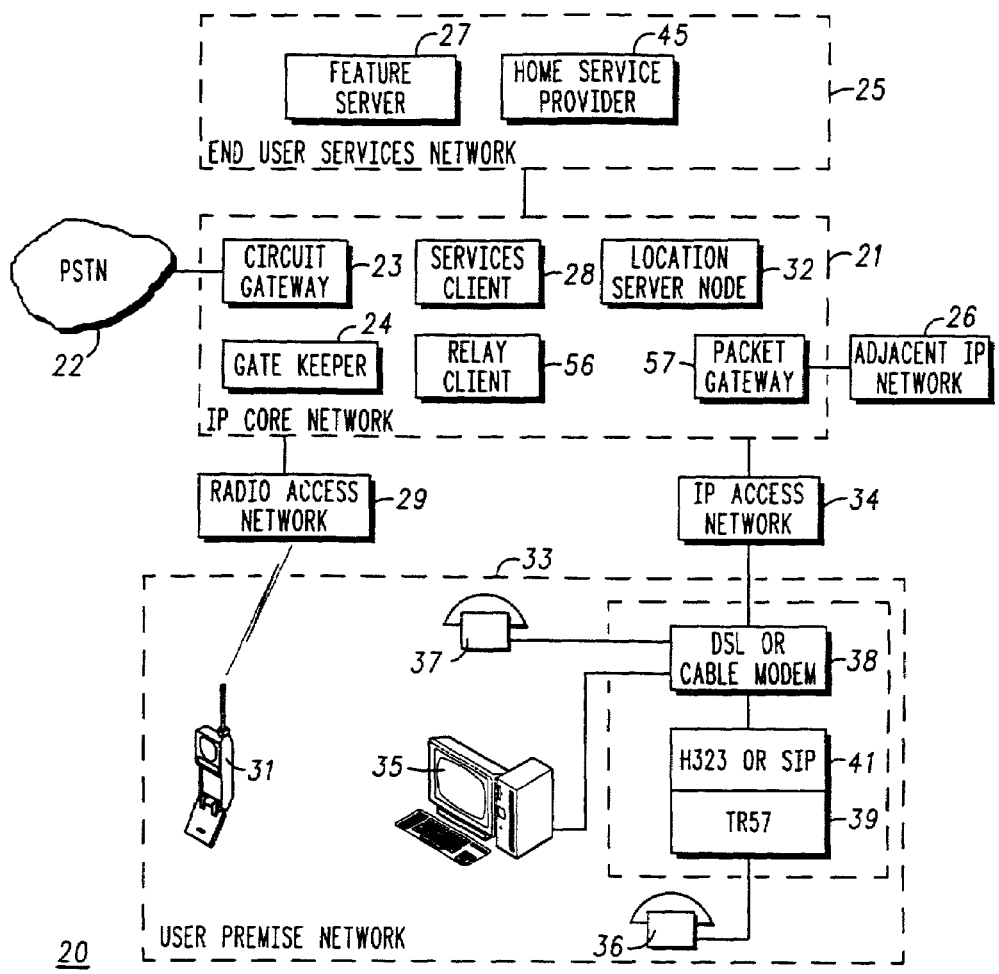
FIG. 1 is a schematic block diagram illustration of a system made in accordance with the present invention.

A system 20 for transmitting multiple types of data through an IP core network 21 is illustrated in FIG. 1. The IP core network 21 is coupled to a PSTN 22 through an appropriate interface, which will be discussed in greater detail below but which is illustrated by way of the gateway 23 and gatekeeper 24. The IP core network 21 is also linked to additional service provider equipment such as the end user services network 25. Optionally, the IP core network 21 may be linked to an adjacent IP network 26 or 20 which includes a computer or Internet telephone but such a coupling is not necessary.

The end user services network 25 includes a feature server 27 which may provide a variety of functions including, but not limited to, enabling the consumer to subscribe or purchase service, billing or payments, validation of authorized access and use, transfer of services, one or more value added services, H.323 or session initiation protocol (SIP) endpoint capabilities, user interaction capabilities (e.g. digit/voice recognition, announcement streaming) and web server function.

The services client 28 is explained in greater detail below in FIG. 3 but, briefly, preferably includes a call model that provides a set of triggers and notifications to local service logic. The services client 28 also maintains a subscriber profile information and busy status and includes a service logic control function to control initialization and interaction with the feature servers 27. The services client 28 may include a call control component that has control of the bearer and data paths. The services client 28 may also include a resource control component that allows access to locally available resources (e.g. tone/announcement or billing servers).

The radio access network 29 provides a wireless voice over IP radio access network that is responsible for the radio channel management and mobility aspects of the wireless handset 31. The location server node 32 is responsible for the determination of the location of the wireless handset 31 or any radio or cellular user device that is active in the system 20. The location server node 32 supports both autonomous as well as solicited (on-demand) location requests. The location server node 32 supports both network based as well as wireless handset based and hybrid (network assisted or handset assisted) determination solutions, including global positioning systems—GPS. The location server node 32 performs its positioning role by gathering various radio signature information from the radio access network 29 and the wireless handset 31. Then, the location server node 32 fuses the information to arrive at a latitude, longitude, possible altitude and a confidence factor. The information is retained in the location server node 32 database while the wireless handset 31 is active in the system 20. For on-demand location of the wireless handset 31, the location server node 32 is responsible for coordinating all elements required to perform the location as well as the processing of the resultant signature information. The IP core network 21 provides the capability to identify the geographic location of the wireless handset 31 or active subscriber.

The IP core network 21 is coupled to the user premise network 33 by way of an access IP network 34 as shown in FIG. 1. The user premise network 33 includes the subscriber devices such as the wireless handset 31, a computer 35, a wired handset 36 and/or an IP telephone 37. Information is routed to and from the IP telephone 37 and computer 35 by way of a digital subscriber line (DSL) or cable modem, indicated generally at 38. A TR57 interface 39 is provided for performing analog local loop functions such as dial tone and digit collection and an interface 41 is provided for converting information (control and voice data) into packetized H.323 protocol or SIP protocol used in voice over IP networks. The interface 41 allows the voice traffic to be carried over the data carriage of wire or cable and provides a method to deliver voice traffic to a competitive local exchange carrier (CLEC) without going through a LEC class 5 switch. It will also be noted that, in the DSL case, the interface 38 may be located at a centralized place in the system 20, in the form of a DSL access multiplexer (DSLAM), for example. While not specifically pictured, the user premise network 33 provides an RJ11 interface for analog telephone/fax wiring and data connection port for the computer 35. The input/output of the user premise network 33 to the access IP network 34 is provided in the standard protocol for carrying data over the local loop copper (xDSL) or coax or fiber optic cable.

As shown below, the wired infrastructure of the user premise network 33 at the subscriber's home can be integrated into the use of the wireless handset 31 so that features previously associated with the wired handset 36 can be utilized with the wireless handset 31.

Figure 2:
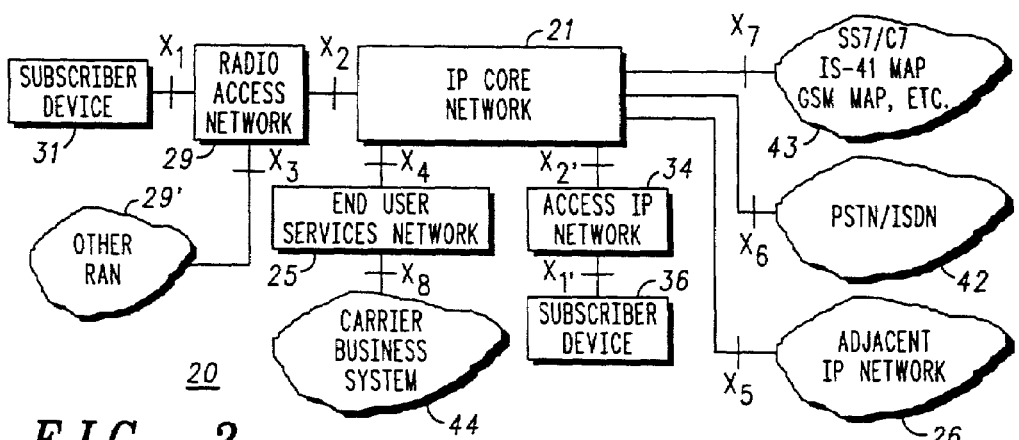
FIG. 2 is another schematic block diagram of a system made in accordance with the present invention and more particularly illustrating the coupling of the IP core network to the radio access network, end user services network, access IP network, adjacent IP network, PSTN or ISDN and external transport networks.

FIG. 2 is another block diagram illustrating the architecture of the system 20 and the interfaces $X_1$ through $X_8$ and $X_1'$-$X_2'$. At the outset, it will be noted that the system 10 must accommodate a variety of subscriber devices 31, 36. Possible subscriber devices will have either no inherent support of voice over Internet protocol (VoIP) to devices that fully integrate support of a VoIP client in the device including IP signaling and data aggregation.

The radio access network (RAN) 29 and access IP network 34 provide the basic transmission, local control and management functions needed for the subscriber devices 31, 36 to access the resources of the IP core network 21 and the end user services network 25. As indicated in FIG. 2, the system 20 is also capable of supporting an alternative or other RAN 29'.

External circuit switched networks are indicated at 42 and external signaling based upon signaling system number 7 transport networks is indicated at 43.

The interfaces illustrated in FIG. 2 are as follows. $X_1$ is the air interface between the subscriber device, such as a wireless handset 31 and the RAN 29. The RAN 29 can support any one or more of, but not limited to, the following $X_1$ interfaces and variants thereof. IS-95 A, B, C; GSM; GPRS; WCDMA; UMTS; cdma2000; EDGE; and iDEN. $X_1'$ is the interface point between the subscriber device and the access IP network 34. By way of example only, the $X_1'$ interface may be a cable modem or DSL modem. Accordingly, the access IP network 34 may include support for any one or more of the following $X_1'$ interfaces and variants thereof: xDSL; VDSL; ADSL; and Cablelabs DOCSIS.

The $X_2$ interface is an internal interface between the RAN 29 and IP core network 21. However, the $X_2$ interface may become an external interface when the RAN 29 is provided in a stand-alone configuration. The RAN 29 and IP core network 21 includes support for the following $X_2$ interfaces and variants thereof: GSM A; GSM $G_b$; GSM Network Management; UMTS $I_u$; CDG IOS (3GPP2 IOS) A1/A2; iDEN EBTS-DPSD & EBTS-MDG; Common Network Management for this reference architecture; and Common Control Protocols used in this reference architecture.

$X_2'$ is the interface point between the access IP network 34 and the IP core network 21. The access IP network 34 and IP core network 21 includes support for any one or more of the following $X_2'$ interfaces and variants thereof: SGCP/MGCP; H.323/SIP+Extensions; and IP Data Protocols. $X_3$ is the interface between the RAN 29 and the alternative RAN 29'. $X_3$ may be either an internal or external interface and the RAN 29 and the alternative RAN 29' may include support for any one or more of the following $X_3$ interfaces and variants thereof: CDG IOS (3GPP2 IOS) A3/A7; UMTS Iur; and iDEN iDAC-iDAC.

$X_4$ is the interface between the IP core network 21 and the end user services network 25. $X_4$ supports the provision of services to the consumer. The IP core network 21 and end user services network 25 may include support for any one or more of the following $X_4$ interfaces and variants thereof: IS-41C and GSM MAP. $X_5$ is the interface between the IP core network 21 and the external packet network or adjacent IP network 26. The IP core network 21 may include support for any one or more of the following $X_5$ interfaces and variants thereof: TR45.6; UMTS; Mobile PPP; and IP. $X_6$ is the interface between the IP core network 21 and the external circuit switched network 42. The IP core network 21 may include support for any one or more of the following $X_6$ interfaces, including variants thereof: V5.2; TR303; CAS; MFC/R2; Basic Rate ISDN, T1 PRI/E1 PRI; and ATM. $X_7$ is the interface point between the IP core network 21 and the external signaling based upon the SS7 transport networks 33. The IP core network 21 may include support for any one or more of the following $X_7$ interfaces or variants thereof: SS7/C7; IS-41C; GSM MAP; ITU TCAP; ANSI TCAP; GSM CAMEL; AIN; and SDP. $X_8$ is the interface point between the end user services network 25 and the carrier business system 44. It will also be noted that the interface $X_5$ may also be utilized for various management data exchanges. The end user services network 25 may include support for any one or more of the following $X_8$ interfaces and variants thereof: CORBA/IDL; TMN CMIP Q3; SNMP; and FTP.

Figure 3:
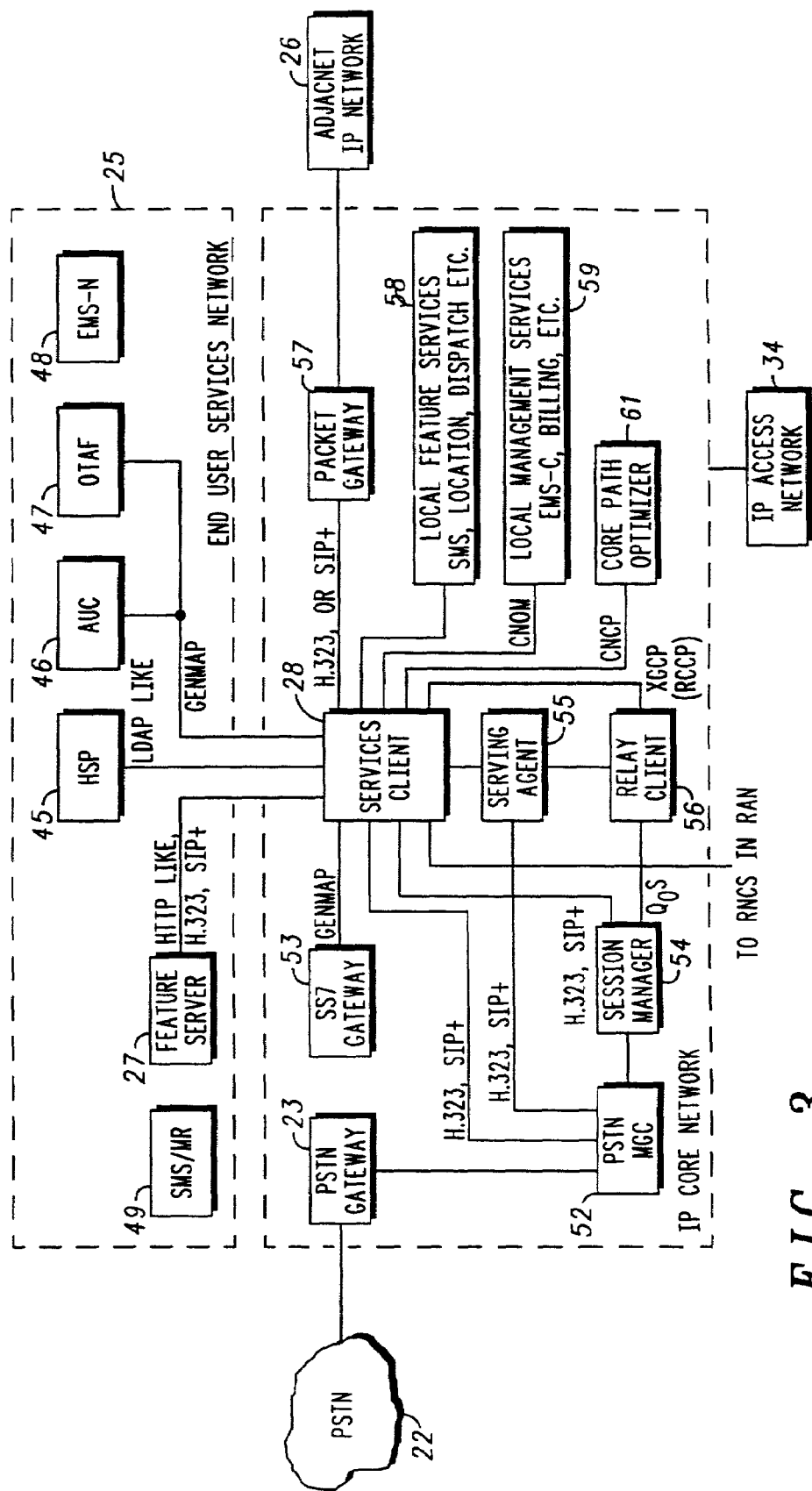
FIG. 3 is a schematic block diagram illustrating the services client and associated interfaces of the IP core network of FIG. 1 as well as a block diagram illustrating the interaction between the services client and the end user services network of FIG. 1.

As shown in FIG. 3, the IP core network 21 includes some or all of the following functions, variations thereof as well as other possible functions that will become apparent to those skilled in the art: the PSTN gateway 23; the PSTN media gateway controller (PSTN MGC) 52; the SS7 gateway 53 as well as gateways for other supported $X_7$ interfaces; the session manager 54; the services client 28; the serving agent 55; the relay client 56; the packet gateway 57; local feature services such as short message services, location indicator, dispatch, etc.; local management services 59 such as element management system-core network (EMS-C), billing, etc.; and the core path optimizer 61.

Table 1 provides examples of the interfaces used between the functional elements discussed above in FIGS. 1-3. The functional elements have been abbreviated but the reference numerals used in FIGS. 1-3 are indicated.

The protocols used in the architecture of the system 20 include air interface (AI) which is the control interface between the mobile subscriber and the RAN 29. Client application protocol (CAP) which is the control interface for the serving agent 55. Core network control protocol (CNCP) which is the control protocol exchanged between the RAN 29 and the IP core network 21. Core net operation, administration, maintenance and provisioning (CNOM) which is the control interface between the EMS-C and the other managed members of the IP core network 21. Feature application program interface (FAPI) which is the interface between the feature server 50 and the relay client 56. Radio network control protocol (RNCP) which is the control interface used among the elements of the RAN 29.

Radio network operation, administration, maintenance and provisioning (RNOM) which is the control interface used between the EMS-R and the other managed members of the RAN 29. End user services net operation, administration, maintenance and provisioning protocol (SNOM) which is the control interface used between the EMS-N and the other managed members of the end user services network 25. This protocol may be a subset of CNOM discussed above. Finally, generic mobile application part protocol (genMAP) which is the control interface for supporting the mobility management facilities within the IP core network 21.

As shown in Table 1, a large number of interfaces are specified as H.323/SIP+. The session initiation protocol (SIP) is defined initially in request for comment 2543. As is common with Internet standards, it can be expected that extensions to this protocol will be proposed in future requests for comments (RFC's). The use of SIP+ encompasses the initial RFC 2543 and extensions thereof. Such extensions may include roaming and handoff related functions as well as functions associated with the authentication and security. H.323 is a standard developed under the international telecommunication union (ITU). When H.323 is used, it refers to the H.323 standard and related standards that are under the H.323 umbrella such as H.224.0 for connection establishment. Note that while H.323+ is not indicated, it is expected that there will be continuing extensions of this standard via newer versions (i.e. version 2 is the current standard while version 3 is under development) and later versions will provide extensions as required to support mobile calls.

TABLE 1

|  | P-GW (57) | SS7-GW (53) | PSTN-CW (23) | PSTN-MGC (52) | SM (54) | SA (55) | SC (28) | CPO (61) | RC (56) |
|---|---|---|---|---|---|---|---|---|---|
| P-GW (57) | — | N/A | N/A | N/A | H323/SIP+ | N/A | Bearer Path RTP | CNOM | N/A |
| SS7-GW (53) | N/A | — | N/A | AIN | N/A | N/A | AIN/MAP | CNCP | N/A |
| PSTN-GW (23) | N/A | N/A | — | xGCP | N/A | N/A | N/A | N/A | Bearer Path (RTP) |
| PSTN MGC (52) | N/A | AIN | xGCP | — | H323/SIP+ | CAP | H323/SIP+ | N/A | N/A |
| SM (54) | H 323/SIP+ | N/A | N/A | H 323 RAS/SIP+ | Telephoney Routing (TBD) | CAP | H 323-SIP+ | N/A | QoS |
| SA (55) | N/A | N/A | N/A | CAP | CAP | — | CAP | N/A | N/A |
| SC (28) | H 323/SIP+ | genMAP/AIN | N/A | H 323/SIP+ | H 323/SIP+ | CAP | — | CNCP | RCCP/xGCP |
| CPO (61) | N/A | N/A | N/A | N/A | N/A | N/A | CNCP | CNCP | N/A |
| RC (56) | Bearer Path (RTP) | N/A | Bearer Path (RTP) | N/A | QoS | N/A | RCCP/xGCP | N/A | Bearer Path (RTP) |
| EMS-C (59) | CNOM | CNOM | CNOM | CNOM | CNOM | CNOM | CNOM | CNOM | CNOM |
| HSP (45) | N/A | genMAP | N/A | N/A | LDAP-like | N/A | LDAP-like | N/A | N/A |
| External Network (26, 34, 42, 43) | Bearer Path IP (to PDN) | SS7/ANSI41/MAP (to PSTN) | u-Law a-Law (to PSTN) | ISUP, MPC-R2, ISDN, etc (to PSTN) | N/A | N/A | N/A | N/A | N/A |
| RAN (29) | N/A | N/A | N/A | N/A | N/A | CNCP | N/A | CNCP (to RNCS) | Bearer Path (to BC) |
| Feature Server (50) | N/A | N/A | N/A | N/A | H 323/SIP+ | N/A | H 323/SIP+ Feature API (HTTP) | N/A | Bearer Path (TCP/UDP/IP) |
| SMS/MR (49) | N/A | genMAP | N/A | N/A | N/A | N/A | N/A | N/A | N/A |
| AuC (46) | N/A | genMAP | N/A | N/A | N/A | N/A | N/A | N/A | N/A |
| OTAF (47) | N/A | N/A | N/A | N/A | N/A | N/A | N/A | N/A | N/A |

TABLE 1-continued

| | EMS-C (59) | HSP (45) | External Network (26, 34, 42, 43) | RAN (29) | Feature Server (50) | SMS/ MR (49) | AuC (46) | OTAF (47) |
|---|---|---|---|---|---|---|---|---|
| P-GW- (57) | Bearer Path (RTP to PDN) | N/A | N/A | N/A | N/A | N/A | N/A | N/A |
| SS7-GW (53) | CNOM | genMAP | SS7/ANSI 41/MAP (to PSTN) | N/A | N/A | MAP | genMAP | N/A |
| PSTN-GW (23) | CNOM | N/A | n-Law, a-Law (to PSTN) | N/A | N/A | N/A | N/A | N/A |
| PSTN MGC 52) | CNOM | N/A | ISUP, MPC-R2, ISDN, etc (to PSTN) | N/A | N/A | N/A | N/A | N/A |
| SM (54) | CNOM | LDAP-like | N/A | N/A | N/A | N/A | N/A | N/A |
| SA (55) | CNOM | N/A | N/A | CNCP (to RNCS) | N/A | N/A | N/A | N/A |
| SC (28) | CMP, | LDAP-like | N/A | CNCP (to RNCS) | H 323/ SIP +Feature API (HTTP) | N/A | N/A | genMAP |
| CPO (61) | CNOM | N/A | N/A | CNCP (to RNCS) | N/A | N/A | N/A | N/A |
| RC (56) | CNOM | N/A | N/A | Bearer Path (RTP to BC) | Bearer Path (RTP) | N/A | N/A | N/A |
| EMS-C (59) | — | CNOM | N/A | N/A | CNOM | N/A | N/A | N/A |
| HSP (45) | CNOM | — | N/A | N/A | N/A | genMAP | genMAP | genMAP |
| External Network (26, 34, 42, 43) | CNOM | N/A | — | N/A | N/A | N/A | N/A | N/A |
| RAN (29) | N/A | N/A | N/A | — | N/A | N/A | N/A | N/A |
| Feature Server (50) | CNOM | N/A | N/A | N/A | — | N/A | N/A | N/A |
| SMS/MR (49) | N/A | genMAP | N/A | N/A | N/A | — | N/A | N/A |
| AuC (46) | N/A | genMAP | N/A | N/A | N/A | N/A | — | genMAP |
| OTAF (47) | N/A | genMAP | N/A | N/A | N/A | N/A | genMAP | — |

Referring to FIG. 3, the serving agent 55 operates in the control plane and manages service requests either to or from subscribers or consumers. The serving agent 55 is used to establish an association between the user, the service request and the services client 28. The serving agent 55 supports the following functions: home service provider look-up; selection of service client hosts; and call signaling address look-up for allocated services clients. The serving agent 55 interacts with the services client via the CAP interface to instantiate or delete services clients. The serving agent 55 interfaces with the session manager 54 via the CAP interface and with the RNCS 62 via the CNCP interface for session initiation. The serving agent responds to requests from the PSTN MGC 52 to locate and/or instantiate the services client 28 using CAP. The serving agent 55 interacts with the EMS-C of the local management services 59 over the CNOM interface.

Figure 7:
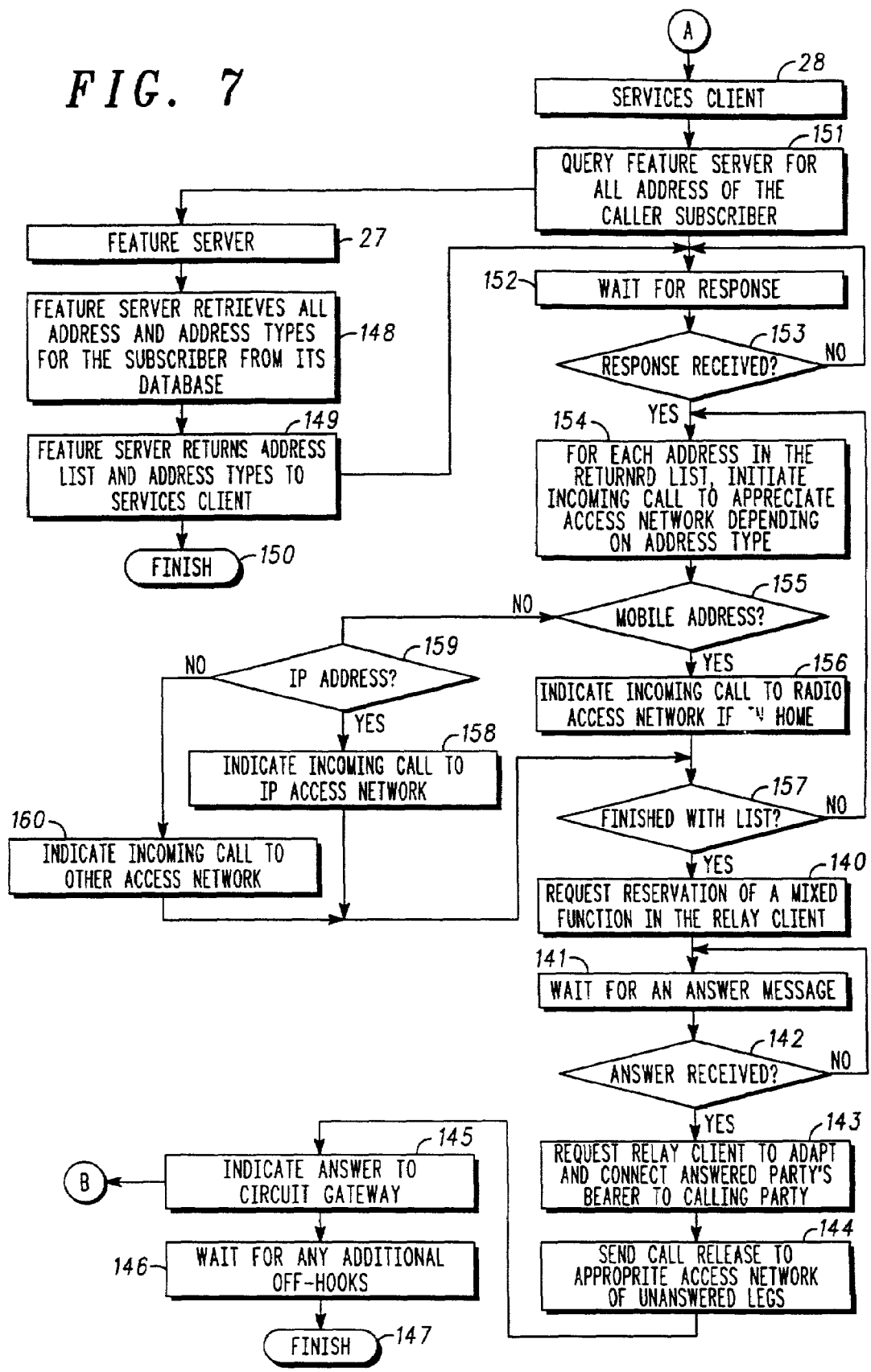

As shown in FIG. 3, the services client 28 operates in the control plane and is the IP signaling proxy for the subscriber device. The services client 28 can include a client call model that provides a set of triggers and notifications to local service logic and that maintains a subscriber profile information and busy status. The services client 28 can also include a service logic control function to control initialization and interaction with the feature or feature servers 21. The services client 28 can also include a call control component that has control of the bearer and data pads. The services client can also include a resource control component that allows access to daily available resources such as tone/announcements or billing servers. The services client 28 also provides a mobility control function which is a mobility proxy for the mobile subscriber. Such a mobility control function may include an authentication process, registration, hand-offs within the IP core network 21 or RAN 29, interworking with legacy mobile networks, management of paging to the mobile subscriber or wireless handset 31 and providing billing information for mobile specific actions. As shown in FIG. 7, the services client 28 interacts with the serving agent 55 over the CAP interface, with the core path optimizer 61 over the CNCP interface, with the relay client 56 over the relay client control protocol interface (RCCP) which is a subset of the xGCP interface. The services client 28 is responsible for control of the call or session. The relay client 56 is responsible for management of the bearer facilities required to support the call or session. The services client 28 controls the usage of the relay client 56 during a given call or session using xGCP.

The services client 28 interacts with the session manager 54 to perform E.164, IMSI, and Cell ID translation to IP address via H.323 or SIP+ and the PSTN MGC 52 using H.323 or SIP+ protocols for service handling. The services client 28 interacts with the home service provider (HSP) 45 via an interface like LDAP to obtain subscriber profile information that may include feature server addresses associated with the subscriber. The services client 28 interfaces with the authentication center (AuC) 46 and the over-the-air facility (OTAF) 47 via genMAP. Signaling for the RAN 29 is carried out by the services client 28 using core network control protocol (CNCP). The services client 28 interacts with the SS7 signaling gateway 53 via genMAP. The services client 28 interfaces with the core path optimizer 61 using CNCP and interfaces with the packet gateway 57 using H.323 or SIP+.

The services client 28 interacts with the feature server or servers 50 via H.323 or SIP+. The services client 28 interacts with the EMS-C of the location management services 59 over the CNOM (core network operations management) interface.

Figure 4:
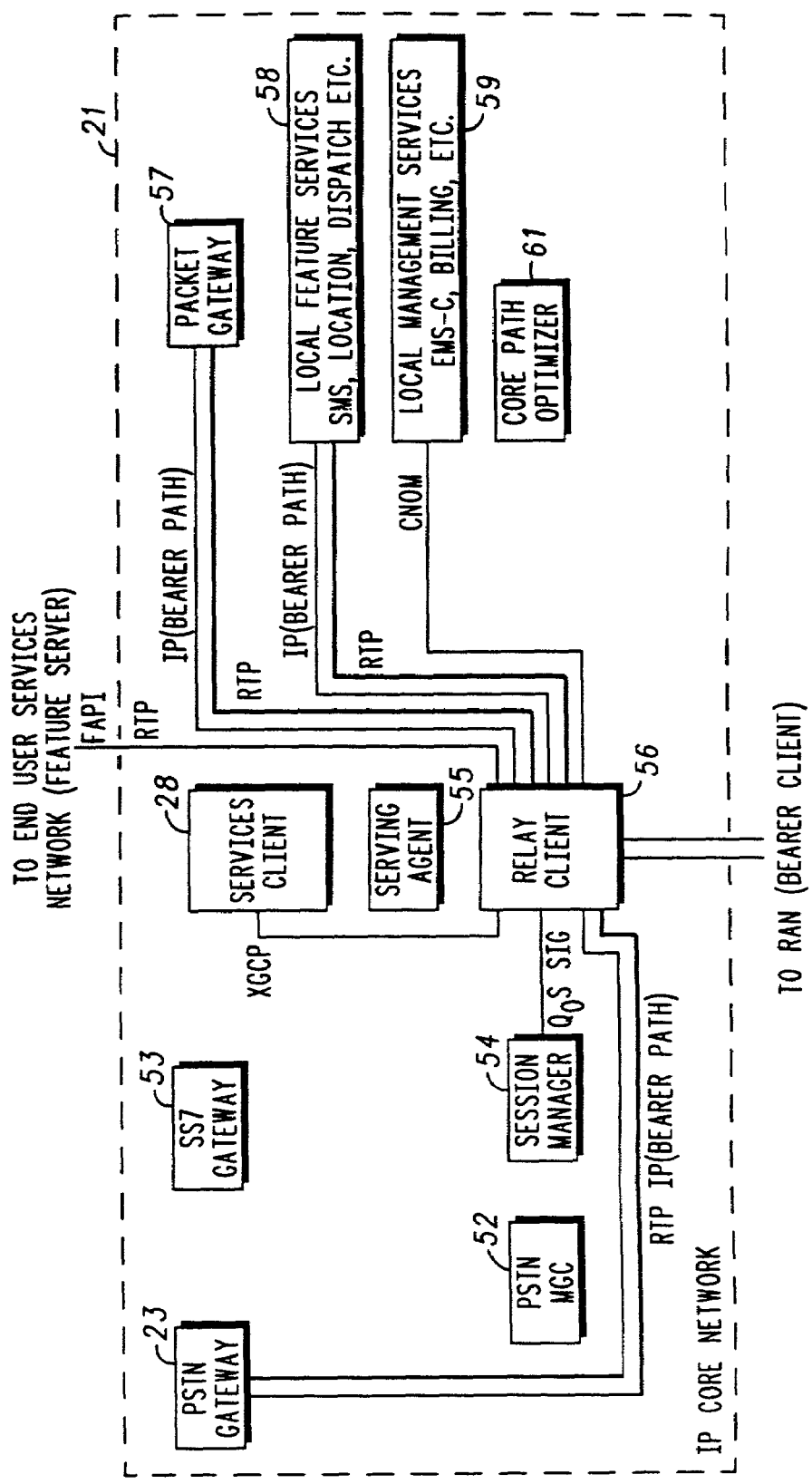
FIG. 4 is a schematic block diagram illustrating the relay client and associated interfaces of the IP core network of FIG. 1.

Referring to FIG. 4, the relay client (RC) 56 operates in both the signaling and bearer planes. The relay client 56 provides an anchor point for the bearer stream and signaling to support mobile subscribers. This function enables a common IP core network 29 architecture to readily support both mobile and fixed devices. The relay client 56 performs a bearer stream routing and selection. The relay client 56 is also responsible for injection of tones and announcements into the bearer stream and provides multi-casting capabilities when required for services such as wiretap, handoff and broadcast.

The relay client 56 would also typically house the mixer function to support multiparty bridging. The mixer function is responsible for distribution of the bearer stream to all parties participating in the call or session. In this distribution function, the mixer must take into account the various bearer capabilities of each endpoint so that both high speed and low speed devices may participate in the dialogue. The simplest role for the mixer occurs in a standard voice call where all parties have the same bearer capabilities. Here, in that it is an IP core network 21, RTP is used for voice delivery and the mixer is inserted into the stream to effect a bridge. In this role, the mixer will function by taking the input stream from one party and multicasting it to the other parties in the call. If more than one of the parties sources input at the same time, the mixer may support a user or carrier defined priority function, always deferring the audio sourcing to the highest priority port. Alternatively, in the case of voice, it could sum the streams in the PCM domain then convert back to RTP and broadcast the result.

In a more complex scenario where the parties have different bearer capabilities, the role of the mixer expands to tailoring the flows based on bandwidth and device capability. For example, if the source were video and one target bearer was a broadband cable modem and the other a low speed wireless link, the mixer must adapt the output to fit the bandwidth available for each stream.

The services client 28 interfaces with the relay client 56 via xGPC and the relay client 56 interfaces with the session manager 54 via a QoS signaling protocol. The relay client 56 interfaces with the packet gateway 57, PSTN gateway 23 and feature servers using RTP. The relay client interacts with the EMS-C of the local management services 59 over the CNOM interface. The relay client 56 receives code and configuration data from the EMS-C and the EMS-C is the recipient of alarm/events from the relay client 56. Further, the EMS-C collects statistics from the relay client 56.

Referring to FIG. 3, the PSTN media gateway controller (MGC) 52 supports a call model for the control and interworking between the PSTN gateway 23 and the IP core network 21. The PSTN MGC 52 manages the call halves according to the specific needs of the signaling on a specific interface. SS7 signaling to the PSTN 22 is controlled by the PSTN MGC 52 interfacing with the SS7 gateway 53. The bearer path to the PSTN 22 is controlled by the PSTN MGC 52 interfacing with the PSTN GW 23. The PSTN MGC 52 supports the following functions: appropriate circuit switching and signaling; origination of a call; termination of a call; generation of billing data; collection of billing data; dual-tone multi-frequency generation and detection; progress tone generation; recorded announcement; dialed digit analysis; and inbound call router. The PSTN MGC interacts with the PSTN 42 using appropriate national signaling (SS7 via the SS7 GW 53). Protocols may include ISUP, MFC-R2, ISDN, etc. The PSTN MGC interfaces with the session manager 54 and services client via H.323 or SIP+. The PSTN MGC 52 interacts with the PSTN 22 by controlling the bearer traffic through the PSTN gateway 23 using xGCP. The PSTN MGC 52 also interfaces with the SS7 gateway 53 via SIGTRAN transporting ISUP and AIN. The PSTN MGC 52 interacts with the serving agent 55 to locate and possibly instantiate services clients via a client application protocol interface (CAP). The PSTN MGC 52 interacts with the EMS-C of the local management services 21 over the CNOM interface.

The PSTN gateway 23 is responsible for accepting inbound calls (voice and data) and delivering outbound calls (voice and data) from and to the PSTN 22. The PSTN gateway 23 supports any one or more of the following functions: interworking with circuit switch networks (PSTN 22) for inward and outward service requests; transcoding of the bearer path payload; supporting call progress tones; supporting recorded announcements for call progress indications; providing transcoding and circuit data IWF functions and providing packet to subrate circuit conversion to support handover and mobile to mobile calls to an existing global system for mobile communications (GSM) or code-division multiple access (CDMA) cellular system which uses transcoder rate adaption units (TRAU). As shown in FIG. 3, the PSTN GW 23 interfaces with the PSTN MGC 52 via xGCP. The PSTN GW 23 interacts with the EMS-C over the CNOM interface.

The SS7 gateway 53 interworks between the internal IP core network 21 and the SS7 network. The SS7 gateway 53 supports media conversion, protocol conversion, generation of charging data, collection of charging data and signaling endpoint (SSP) for the SS7 network as well as serving as an inbound router across the packet transport network. The SS7 interfaces to the PSTN via SS7. The SS7 gateway interfaces to the services client 28 as well as the short message server/message request (SMS/MR) 49 as well as the home service provider (HSP) 45 via genMAP.

The packet gateway 57 provides interworking with packet data networks. The packet gateway supports any one or more of the following functions: generation of charging data; collection of charging data; media conversion; protocol conversion; bandwidth and QoS negotiation with external packet networks; inbound router; firewall; inbound message discrimination; packet relay; packet routing; address translation; packet encapsulation; tunneling; and tracks location from the data subscriber. The packet gateway 57 interacts with the session manager 54 and the services client 28 via H.323 or SIP+. The packet gateway 57 interfaces with the relay client 56 using real time protocol (RTP) over the bearer path. The packet gateway 57 interacts with the EMS-C of the local management service 59 over the CNOM.

The core path optimizer 61 provides the ability to optimize the bearer and control paths if streamlining is applied to affect inter-system mobility. The core path optimizer 61 may bypass the relay client 56 or move to a relay client in another IP core network 21. It may also include the release of local IP core network resources.

The core path optimizer (CPO) 61 interacts with the services client via CNCP and with the radio network control server (RNCS) 62 of the RAN 29 via CNCP. The CPO 61 also interacts with the EMS-C of the local management services 59 via the CNOM.

The feature server or feature servers shown at 27 in FIG. 3 usually perform functions within the control or bearer paths which create subscriber services such as call waiting, voice mail, dispatch, etc. The feature servers 27 may be provided by the wireless service provider in which case there are local feature servers. The feature servers 27 may be provided by a third party service provider existing in the end user's services network 25. The feature server 27 may include any one or more of the following functions: subscription or purchase of service; billing or payment; validation of authorized access and use; transfer of services; one or more value added services; H.323/SIP+ endpoint capabilities; user interaction capabilities (e.g. digit/voice recognition, announcement streaming); and web server function. The feature servers 50 communicate with the services client 28 and session manager 54 using H.323 or SIP+. The feature server communicates with the EMS-C of the local management services 59 over the CNOM.

The location service node is a part of the local feature services 58 and is responsible for determination of the location of any radio user active device in the system 20. The location service node (LSN) supports both autonomous as well as solicited (on-demand) location requests. The location service node supports both network based as well as handset based (i.e. GPS) determination solutions.

The LSN performs its positioning role by gathering various radio signature information from the RAN 29 and the handset, then fusing this information to arrive at a latitude, longitude and possible altitude and a confidence factor. The information is retained in the LSN database while the mobile handset 31 is active in the system 20. For on-demand location, the LSN is responsible for coordinating all elements required to perform the location function as well as the processing of the resultant signature information.

The IP core network 21 provides the capability to identify the geographic location of the active subscriber. The LSN interacts with the element management system-core network (EMS-C) over the CNOM.

The local management services function 59 may also include a billing server in addition to the EMS-C. The home service provider (HSP) 45 is the master database for a given subscriber. The HSP 45 interacts with the SS7 gateway 53 and over the air facility (OTAF) 47 via genMAP. The HSP 45 interacts with the element management system-network (EMS-N) 48 over the network management interface.

The authentication center (AuC) 46 is the repository for security data related to the mobile subscriber. It includes a repository of subscriber security data, administration of subscriber security data and generation of per execution security sets. The AuC 46 interfaces with the OTAF 47, HSP 45 and SS7 gateway 53 via genMAP, which provides secure transmission of the application data. The AuC 46 also interacts with the EMS-N 48 over the network interface.

The SMS/MR (short message service center/message register) 49 provides the message center functions for point to point message services which includes message creation, message relay, message storage, message delivery, tracking of delivery status of messages, generation of charging data and transfer of charting data. The SMS/MR 49 interfaces with the HSP 45 via the genMAP interface for the routing of messages and it obtains the routing address for the subscriber from the HSP 45. The SMS/MR 49 interfaces with the SS7 gateway 53 via genMAP as well. The SMS/MR 49 interacts with the EMS-N 48 over the network management interface. The SMS/MR 49 interfaces with the services client 28 via the genMAP interface for message delivery. The message is passed to the subscriber via the CNCP (core network control protocol) resources.

The over the air facility (OTAF) 47 allows the subscriber unit to be activated and provisioned remotely via the air interface. The OTAF 47 provides the service provider with the ability to provide active equipment over the air, which eliminates the need for subscribers to go to a service provider facility. The OTAF 47 supports the termination of over the air calls, initiation of data sessions to update the subscriber unit, initiation of short messages to update the subscriber unit, forwarding of calls, for example to IVR servers when appropriate, acquiring subscriber security information from the AuC 46, delivering security information to the subscriber device, assignment of subscriber identity, such as name, E.164, E.212 and H.323 ID, collection of subscriber data need to validate activation and generation of transfer subscriber profile. The OTAF 47 interacts with the HSP 45, AuC 46 and the services client 28 via the genMAP interface or, in the case of the HSP 45, the IP interface. The OTAF interacts with the EMS-N 48 over the network management interface.

The EMS-N (element management system-network applications) 48 provides element management facilities for the service platform of the wireless access network which include the HSP 45, AuC 46, SMS/MR 49, feature server 50 and OTAF 47. The EMS-N 48 is based upon a common element management environmental platform that includes both hardware and software. The platform offers a common distributed object interface, a distributed data-spaced environment and a common set of management application interfaces. The EMS-N 48 provides the basic element management for the end user services network 25 elements. The EMS-N 48 interacts with the various end user services network elements over the network management interface.

With the aforementioned apparatus in place, it is now possible to effect a unified wired/wireless service offering from two previous disparate networks. For purposes of clarification, the following paragraphs will detail a call flow to the IP core network 21 that will involve the PSTN, the wireless access network and the wired network. The service aspect described will be that of the wireless phone behaving as a cordless phone when in the home and as a cellular phone outside the home. In cordless mode, the phone will behave as a peer to the wired phones. Two flows will be illustrated, the first describing the subscriber registration process and the second detailing the actual service flow.

Figure 5:
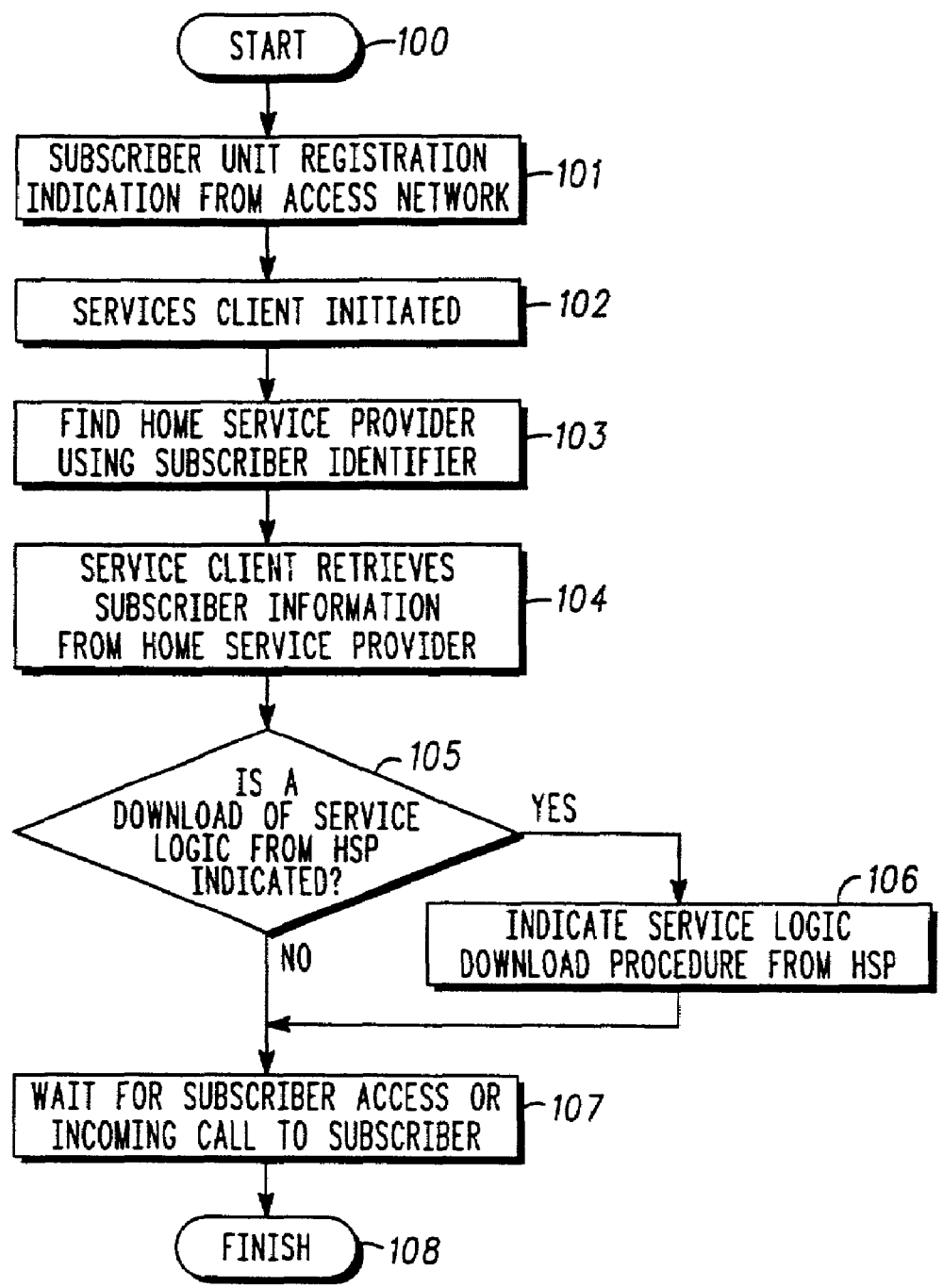
FIG. 5 is a schematic flow diagram illustrating the algorithm for subscriber registration.

Upon entering a wireless access system, the mobile device must register to inform the system of its presence, thereby enabling service delivery. FIG. 5 depicts the registration process. The process begins with the terminal initiating a registration indication to the network based on the appropriate air interface protocol, step 101. When the IP core network 21 receives the registration notification, it creates an instantiation of the services client 28 to serve as the proxy for this terminal in the serving network of step 102. From an algorithmic perspective, this step involves allocating memory and a state machine to serve as a proxy for the terminal. The next step involves identifying the home service provider (HSP) 45 for this particular subscriber at step 103, then updating the feature profile for the subscriber in the serving system at step 104. This updating may involve downloading of service logic from the HSP 45 at steps 105 and 106. Upon completion of the instantiation and updating, the services client 28 enters a dormant state until further activity occurs related to that subscriber at step 107. At this point, call delivery may occur in the serving network.

Figure 6:
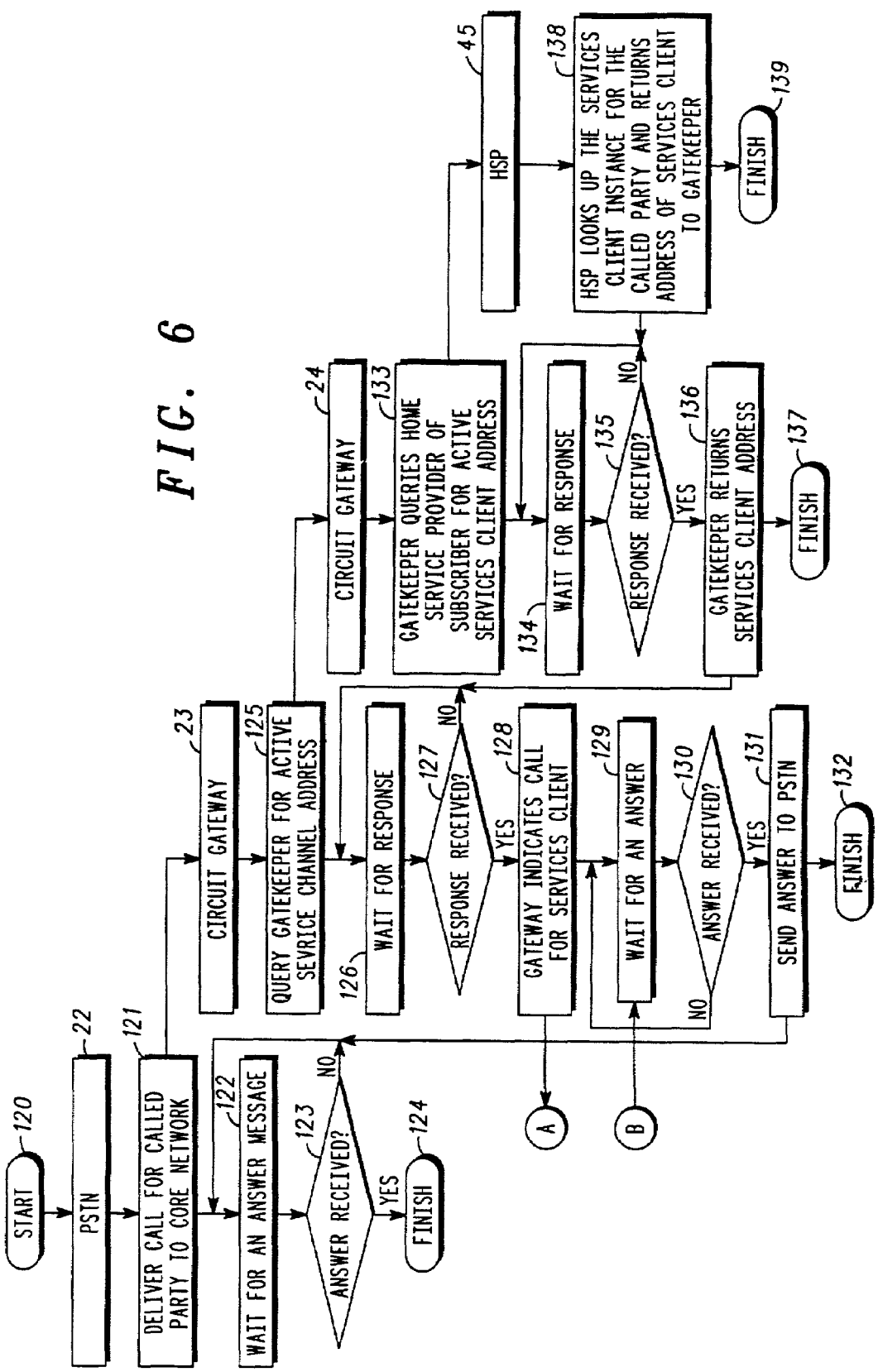
FIGS. 6 and 7 are schematic flow diagrams illustrating the algorithm for call completion.

FIG. 6 depicts what actually occurs during a PSTN initiated call to a subscriber of this service who has both a wired and wireless unit. In this particular case a land to mobile call is described, with the PSTN 22 delivering the call to the subscribers home network, which for this case is also the serving radio access network. This example can be readily extended to cover the case where serving radio network and ingress network are not the same (roaming mobile).

The flow begins with a PSTN subscriber calling a subscriber currently served by the IP network 21 at step 121. The PSTN 22 delivers the call to the circuit gateway 23. The circuit gateway, upon receipt of the digits, must query the gatekeeper 24 for the address of the active instance of the services client 28 at step 125. The gatekeeper 24 queries the HSP 45 for the active services client address 28 at step 133 and waits for the response at Step 134. The HSP 45 receives the gatekeeper query, accesses its database for the location of the services client 28, which will be found in the serving system, and returns the appropriate addressing information at step 138. When the gatekeeper 24 receives the response from the HSP 45 at step 135, it returns the addressing information to the circuit gateway 23 at step 136. The circuit gateway 23 then initiates a call session with the aforementioned instance of the services client 28 at step 128. It may also apply progress tones as appropriate to the calling party.

Turning to FIG. 7, when the services client 28 receives the call indication, it first must determine the physical means by which the subscriber may be reached at step 151. It queries the feature server 27 for the physical routing information. Note that this step may be omitted if the address information were downloaded at the registration procedure. The feature server 27 determines the number of means by which the subscriber may be reached and the network addresses at step 148, then returns that information to the services client 28 in Step 149. The services client 28 receives the response in Step 153. For each address enclosed in the list, the services client 28 must then instruct each network serving that address to instantiate a link and alert the called party at step 154. The services client 28 parses between mobile networks at step 155, IP networks at step 159 or other networks at step 160. For each network type, the appropriate signaling is issued to establish the link. For mobile networks, physical location is used to determine if the party is considered "home" or not at step 156. This is determined by querying the LSN to match the actual physical location of the subscriber handset with his preassigned geographical "home" zone. If the unit is inside of the preassigned geographical area, it is considered "home." If "home," or "extension mode," the party is alerted. If not home, an alert is not sent to the mobile unit. When the list of physical links is exhausted, Step 157, a mixer function is reserved to serve the call at step 140. The services client 28 then waits for indication of answer from the called parties at step 141. Upon receipt of the first answer at step 142, a connection is established. The services client 28 then releases the remaining parties at step 144, and indicates answer to the circuit gateway 23 at step 145. The services client then enters a monitor state at step 146, where it will look for any other off-hook indications from any parties that were alerted in Step 154. If an off-hook occurs, that party would be bridged into the current call, with the mixer providing the appropriate audio. In this manner, the parties act as extensions with respect to one another.

The above example relied on the use of cellular roaming to establish and track the location of the subscriber. Mobile IP could and would also be used to track, or register subscriber location. Additionally, in the above example, the call was a voice call. The concepts disclosed above can readily be extended to data calls as well.

The preferred embodiments of the invention are intended to be illustrative and should not be taken as limiting of the broad scope of the invention set forth in the following claims.

What is claimed:

1. A system for transmitting data through an IP core network so that data may be transmitted from an originating source, though a public switched telephone network (PSTN) and through the IP core network to at least one of a wired handset and a wireless handset, the system comprising:

an IP core network, the IP core network coupled to the PSTN through an interface, the IP core network also coupled to an access IP network, a radio access network coupled to the IP core network and the wireless handset, a register of wired handsets and wireless handsets from among the at least one of a wired handset and a wireless handset and the registered wired handsets and wireless handsets are on the register when such registered wired handsets and wireless handsets are accessible within IP core network and the radio access network and wherein the register is compiled by the handsets when the handsets become accessible on the network, and upon receipt of data from the originating source, the IP core network simultaneously initiating a ringing of the wired handset available on the register through the access IP network and a paging of the wireless handset available on the register through the radio access network.

2. The system of claim 1 wherein, upon receipt of an answer from a plurality of the handsets, the IP core network bridging an audio signal between the wired and wireless handsets.

3. The system of claim 1 wherein, upon receipt of an answer from a plurality of the handsets, the IP core network bridging an audio signal between the wireless handset and a plurality of wired handsets.

4. The system of claim 1 wherein, upon receipt of an answer from a plurality of the handsets, the IP core network bridging an audio signal between a plurality of wired handsets.

5. The system of claim 1 further comprising a user premise network coupled to the IP core network, the user premise network comprising at least one component selected from the group consisting of a modem, a cable modem, an ISDN modem and a DSL modem.

6. The system of claim 1 wherein the interface comprises a gateway and a gatekeeper.

7. The system of claim 1 wherein the interface comprises an H.323 gateway and an H.323 gatekeeper.

8. The system of claim 1 wherein the interface comprises a SIP server and an IP/PSTN gateway.

9. The system of claim 1 wherein the IP core network further comprises a location server node which determines the location of the wireless handset,
and the IP core network, upon receipt of a signal from the location server node that the wireless handset is within a predetermined geographical area, simultaneously initiates the paging of the wireless handset through the radio access network and the ringing of the wired handset.

10. The system of claim 9 wherein the IP core network initiates a ringing of the wired handset through the access IP network.

11. The system of claim 1 wherein the IP core network further comprises at least one feature server for providing call features for data being communicated from the IP core network to the wired and wireless handsets.

12. The system of claim 1 further comprising a user premise network comprising a TR57 interface for providing analog loop functions.

13. The system of claim 12 wherein the TR57 interface is coupled to an H.323 interface for converting voice data transmitted from the wired handset into H.323 protocol.

14. The system of claim 12 wherein the TR57 interface is coupled to a SIP interface for converting voice data transmitted from the wired handset into SIP protocol.

15. The system of claim 7 wherein the H.323 gateway and H.323 gatekeeper are a part of the IP core network.

16. The system of claim 1 further comprising a user premise network comprising a RJ11 interface, a modem and a personal computer wherein the RJ11 interface is coupled to a modem and a personal computer.

17. The system of claim 1 wherein the access IP network is coupled to an Internet telephone and,
upon receipt of data from the originating source, the IP core network simultaneously initiating a ringing of the wired handset, a paging of the wireless handset through the radio access network and a sending of a call message to the Internet telephone through the access IP network.

18. The system of claim 1 wherein the access IP network is coupled to computer and,
upon receipt of data from the originating source, the IP core network simultaneously initiating a ringing of the wired handset, a paging of the wireless handset through the radio access network and a sending of a call message to the computer through the access IP network.

19. The system of claim 1 wherein the IP access network is coupled to a multimedia terminal.

20. A method for simultaneously paging a wireless handset and ringing a wired handset, the method comprising:
providing an IP core network that is coupled to a public switched telephone network (PSTN) through an interface, the IP core network also being coupled to an access IP network,
providing a radio access network coupled to the IP core network and the wireless handset,
receiving data at the IP core network from the PSTN,
registering a wireless handset when such wireless handset is accessible on the radio access network and a wired handset when such wired handset is accessible on the IP network, and
simultaneously initiating a ringing of the wired handset through the access IP network and a paging of the wireless handset through the radio access network.

21. The method of claim 20 further comprising
providing a location server node,
determining a location of the wireless handset,
prior to simultaneously initiating the paging of the wireless handset through the radio access network and the ringing of the wired handset through the access IP network, sending a signal to the IP core network from the location server node indicating that the wireless handset is within a predetermined geographical area.

22. The method of claim 21 wherein the location server node forms part of the IP core network.

23. The method of claim 20 further comprising
providing at least one feature server for providing call features for data being communicated from the IP core network to the wired handset and the wireless handset.

24. The method of claim 20 wherein the feature server forms a part of the IP core network.

25. The method of claim 20 wherein the access IP network is coupled to an Internet telephone and,
upon receipt of data from the originating source, the IP core network simultaneously initiating a ringing of the wired handset, a paging of the wireless handset through the radio access network and a sending of a call message to the Internet telephone through the access IP network.

26. The system of claim 20 wherein the access IP network is coupled to computer and,
upon receipt of data from the originating source, the IP core network simultaneously initiating a ringing of the wired handset, a paging of the wireless handset through the radio access network and a sending of a call message to the computer through the access IP network.

27. A system for transmitting data through an IP core network so that data may be transmitted from an originating source, though a public switched telephone network (PSTN) and through the IP core network to at least one of a wired handset and a wireless handset, the system comprising:
an IP core network comprising a location server node,
the IP core network coupled to the PSTN through an interface, the IP core network also coupled to an access IP network, the interface comprising a gateway and a gatekeeper,
a radio access network coupled to the IP core network and the wireless handset,
a user premise network coupled to the IP core network, a register of wired handsets and wireless handsets from among the at least one of a wired handset and a wireless handset and the registered wired handsets and wireless handsets are on the register when such registered wired handsets and wireless handsets are accessible within the IP core network and the radio access network and wherein the register is compiled by the handsets when the handsets are accessible on the network, and upon receipt of data from the originating source, the location server node determining the location of the wireless handset and, upon receipt of a signal from the location server node that the wireless handset is within a predetermined geographical area, the IP core network simultaneously initiating a paging of the wireless handset through the radio access network and a ringing of the wired handset and, upon receipt of an answer from a plurality of the handsets, the IP core network bridging an audio signal between the wired and wireless handsets.

* * * * *